(12) United States Patent
Visser et al.

(10) Patent No.: US 8,840,944 B2
(45) Date of Patent: Sep. 23, 2014

(54) METHOD FOR IMPROVING THE SENSORY PROPERTIES AND RESISTANCE OF FOOD AND DRINK PRODUCTS TO MICRO-ORGANISMS

(75) Inventors: Diana Visser, Rotterdam (NL); Dirk Alexander Knikker, Streefkerk (NL)

(73) Assignee: Purac Biochem BV, Gorinchem (NL)

( * ) Notice: Subject to any disclaimer, the term of this patent is extended or adjusted under 35 U.S.C. 154(b) by 262 days.

(21) Appl. No.: 13/202,685

(22) PCT Filed: Feb. 22, 2010

(86) PCT No.: PCT/EP2010/052200
§ 371 (c)(1),
(2), (4) Date: Jan. 16, 2012

(87) PCT Pub. No.: WO2010/097364
PCT Pub. Date: Sep. 2, 2010

(65) Prior Publication Data
US 2012/0115952 A1    May 10, 2012

Related U.S. Application Data

(60) Provisional application No. 61/202,408, filed on Feb. 25, 2009.

(30) Foreign Application Priority Data

Feb. 25, 2009 (EP) ..................................... 09153619

(51) Int. Cl.
A23B 4/027 (2006.01)
A23L 3/3454 (2006.01)
A23L 3/358 (2006.01)

(52) U.S. Cl.
CPC ............... *A23B 4/027* (2013.01); *A23L 3/3454* (2013.01); *A23V 2002/00* (2013.01); *A23L 3/358* (2013.01)
USPC ........... 426/321; 426/335; 426/531; 426/532; 426/654; 426/652

(58) Field of Classification Search
CPC ............................... A23B 4/027; A23L 3/3454
USPC .................. 426/321, 335, 531, 532, 654, 652
See application file for complete search history.

(56) References Cited

U.S. PATENT DOCUMENTS

| | | | |
|---|---|---|---|
| 4,794,080 A | 12/1988 | Mays | |
| 4,814,273 A | 3/1989 | Brumm | |
| 5,137,736 A | 8/1992 | Eaton | |
| 5,217,250 A | 6/1993 | Sakata | |
| 2005/0249846 A1 * | 11/2005 | Evans et al. | ............... 426/321 |
| 2006/0159813 A1 * | 7/2006 | Ming et al. | ............... 426/335 |

FOREIGN PATENT DOCUMENTS

| | | |
|---|---|---|
| EP | 1016344 A | 7/2000 |
| KR | 2006028074 A | 3/2006 |
| WO | WO 85/04901 | 11/1985 |
| WO | WO 03/005963 | 1/2003 |

OTHER PUBLICATIONS

Ha J M et al: "Antimicrobial composition comprising methyl isothiazolone compound and preparation method thereof particularly for improved dispersion and storage stability" 20060329, vol. 20067, No. 23, Mar. 29, 2006, XP002525291 abstract.

J.V. Maca, et al., Microbiological, Sensory and Chemical Characteristics of Vacuum-Packaged Ground Beef Patties Treated with Salts of Organic Acids, Journal of Food Science, vol. 62, Issue 3, pp. 591-596, May 1997.

European Search Report and Written Opinion of the European Patent Office Patent Office in counterpart foreign application No. PCT/EP2010/052200 filed Feb. 22, 2010.

Extended European Search Report and Written Opinion of the European Patent Office Patent Office in counterpart foreign application No. EP12169803.9-2114, mailed Jul. 20, 2012.

* cited by examiner

*Primary Examiner* — Sreeni Padmanabhan
*Assistant Examiner* — Irina Neagu
(74) *Attorney, Agent, or Firm* — Peter J. Ims; Westman, Champlin & Koehler, P.A.

(57) ABSTRACT

A method for improving the sensory properties and resistance of food and drink products, especially uncured meat products, to various kinds of micro-organisms and in particular food spoilage and food poisoning bacteria includes contacting the food or drink product with a composition comprising alkali metal salts having as anions propionate and a co-anion selected from lactate, acetate, and combinations thereof, and as cations potassium and hydrogen, wherein the weight-based ratio of lactate/propionate is in the range of 0 to 20 and the weight-based ratio of acetate/propionate is in the range of 0.05 to 3.5.

20 Claims, No Drawings

METHOD FOR IMPROVING THE SENSORY PROPERTIES AND RESISTANCE OF FOOD AND DRINK PRODUCTS TO MICRO-ORGANISMS

CROSS-REFERENCE TO RELATED APPLICATION

This application is a Section 371 National Stage Application of International Application No. PCT/EP2010/052200, filed Feb. 22, 2010 and published as WO 2010/097364 A1 on Sep. 2, 2010, in English, which in turn is based on and claims benefit of U.S. Provisional Application No. 61/202,408, filed Feb. 25, 2009.

BACKGROUND

The discussion below is merely provided for general background information and is not intended to be used as an aid in determining the scope of the claimed subject matter.

An aspect of the present invention pertains to a method for improving both the sensory properties and resistance of food and drink products, especially meat products, to various kinds of micro-organisms and in particular food spoilage and food poisoning bacteria such as *Listeria Monocytogenes*.

Today there is still need for improved methods of food and feed preservation; outgrowth of food spoilage bacteria, molds, and yeasts render millions of pounds of food inedible annually and the problem is especially acute in countries with inadequate refrigeration. There is even a bigger need for solutions to control the activities of food-pathogenic bacteria causing every year food-borne illnesses resulting in a significant number of hospitalizations, many of these being fatal. Bacterial pathogens such as bacteria from the family of *Campylobacter, Enterobacter, Listeria, Salmonella, Escherichia, Clostridium* and *Staphylococcus*, are the most common identified source of food-borne illnesses.

*Listeria Monocytogenes* is a microorganism which is of particular concern in the manufacture of food products in general, and of meat products in particular. *Listeria Monocytogenes* has one of the highest mortality rates of the food-borne pathogenic bacteria. It is widely found in the environment and can gain entrance into a processing plant by way of raw materials, air, and people. Another dangerous aspect of this organism is that *Listeria monocytogenes* can survive longer under adverse environmental conditions than can many other vegetative bacteria that present a food safety concern. In addition to being able to survive and grow at refrigeration temperatures, *Listeria monocytogenes* tolerates high salt concentrations (such as in non-chlorinated brine chiller solutions) and survives frozen storage for extended periods. It is more resistant to nitrite and acidity than many other food-borne pathogens. It also is more resistant to heat than many other non-spore forming food-borne pathogens, although it can be killed by heating procedures such as those used to pasteurize milk.

Taken together, these factors mean that measures should be taken to prevent the growth of *Listeria* and other micro-organisms in food products, e.g., by adding compounds to the food which decrease the growth rate of said organisms. However, the addition of these compounds should not detrimentally affect the taste and other sensory properties of the food product. Meat products are known to be particularly sensitive to changes in taste, texture, colour and other sensory properties. Meat products are also especially sensitive to contamination with food spoilage and/or food poisoning bacteria.

Mixtures of organic acids and/or salts hereof such as lactic acid, acetic, citric, propionic, benzoic, sorbic, ascorbic acid and others are known to be used as antibacterial agents in controlling the activity of micro-organisms such as food spoilage bacteria and food pathogens. Usually they are applied in combination with one or more other antibacterial agents.

Most of the literature describing mixtures of the above-mentioned acids and/or their salts is however directed to the antibacterial effect of such a mixture and its ability in combination with other antibacterial agents to improve the resistance of food and drink products to molds, yeasts and/or bacteria. Most of the literature does not refer to the effects of such mixtures on taste, texture and other sensory properties although this is one of the most important decisive factors or criteria determining whether such an antibacterial mixture is suited for application in food and drink products or not.

It has now been found that the use in food and drink products, and in particular meat products, of a specific combination of potassium propionate and potassium acetate, potassium lactate or a mixture of the latter two components, in a specific ratio provides food and drink products with an increased resistance to micro-organisms such as molds, yeasts and food spoilage or food poisoning bacteria, and in particular to *Listeria Monocytogenes*, while at the same time the taste of the food and drink product is not detrimentally affected and is even improved in some aspects. The latter feature is particularly surprising, since it is known in the art that propionate and potassium by itself do detrimentally affect the taste of food and drink products.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Accordingly, aspects of the present invention pertain to a method and composition for improving the sensory properties and resistance of food and drink products, in particular meat products, to micro-organisms wherein the product is contacted with a composition comprising as anions propionate and a co-anion selected from lactate, acetate, and combinations thereof, and as cations potassium and hydrogen, wherein the weight-based ratio of lactate/propionate is in the range of 0 to 20 and the weight-based ratio of acetate/propionate is in the range of 0.05 to 3.5.

The composition preferably has a pH between 5 and 8 (based on a 10 wt % solution in water) and a direct pH between 6 and 9.

DETAILED DESCRIPTION

In one embodiment the ratio of acetate/propionate is in the range of 0.05 to 2 and even more preferred in the range of 0.5 to 1.5 while most preferred is a range of 0.6 to 1.2, and the ratio of lactate/propionate is in the range of 3 to 15 and more preferred in the range of 3 to 12, while most preferred is a range of 3.5 to 10.

The use of a combination of the potassium salts of propionic acid, acetic acid and/or lactic acid in particular combines a high activity against food spoilage bacteria in fresh meat products and against food pathogens such as *Listeria Monocytogenes* in cooked and fresh meat products with a good taste of the resulting meat product. The specific combination of the potassium salts as used in the method according to the present invention displays an unexpected satisfactory taste sensation. Food and drink products, and especially meat products (including fish and poultry), treated with the method according to the present invention demonstrated remarkable differences in taste sensation with respect to sweetness, saltiness and acidity and in meat products, the meat/meaty taste. Meat products treated with the method according to the present invention showed an improved red colour stability and water holding capacity. A higher water holding capacity can be linked to a higher juiciness and tenderness and may therefore result in an improvement of taste. It was further found that the composition as used herein was very suited for handling and for application in various food and drink products as a higher concentration could be used without running into viscosity-related problems. The higher concentration is further advantageous because of reduced transporting costs.

In one embodiment of the present invention, the composition also contains sodium as cation. In this embodiment the ratio of sodium/potassium is generally in the range of 0.01 to below 1 and more particular in the range of 0.01 to 0.5, most preferred is a range of 0.01 to 0.3.

In some food and drink applications some sodium is desired because it gives a salty taste. One can add sodium to the compositions as used in the method according to the present invention for further fine-tuning of the taste profile of said food and drink applications but the sodium/potassium ratio should remain below 1. Aqueous solutions having a sodium/potassium ratio of higher than 1 were found to have problems with precipitation occurring in said solutions. By adding sodium to the compositions as used herein and maintaining a sodium/potassium ratio of below 1, the salty taste can still be achieved while keeping the advantageous properties of the potassium salts as mentioned above (i.e. not running into viscosity and precipitation-related problems).

An aspect of the present invention is further related to the following preferred potassium and sodium-comprising compositions. A first preferred composition comprises lactate and propionate in a weight-based ratio of lactate/propionate ranging from about 5 to 10, acetate and propionate in a ratio of acetate/propionate ranging from about 0.6 to 1.2 and sodium and potassium in a ratio of sodium/potassium ranging from about 0.1 to 0.25. A second preferred composition comprises lactate and propionate in a weight-based ratio of lactate/propionate ranging from about 3 to 9, acetate and propionate in a ratio of acetate/propionate ranging from about 0.8 to 1 and sodium and potassium in a ratio of sodium/potassium ranging from about 0.1 to 0.35.

These solutions when used in the present invention provide food and drink products and in particular meat products with a favorable taste profile.

The composition as used herein may be made by blending or mixing the separate components in their salt or acid form together with optionally a base such as potassium or sodium hydroxide. The blend may be made for example (and not limited to) by blending water, potassium lactate, propionic acid, acetic acid and optionally potassium hydroxide or by blending potassium lactate, water, sodium propionate, sodium di-acetate and potassium hydroxide. A further option is to blend lactic acid, potassium hydroxide and sodium hydroxide with sodium propionate.

In one embodiment the potassium and/or sodium salts of propionic and acetic acid are obtained by a fermentation process. Lactic acid or lactate (in potassium and/or sodium form) may be added to the fermentation product in a later stage in order to obtain a composition as used in the method according to the present invention comprising propionate, acetate and lactate. Similarly, an additional amount of acetic acid may be added to the fermentation product in a later stage in the form of acetic acid, vinegar or neutralised vinegar, acetate (sodium/potassium) or sodium di-acetate.

In this embodiment, the composition of propionate, acetate and lactate may be prepared by the following specific process comprising the steps of providing a fermentation product comprising propionate and acetate and adding lactic acid to the fermentation product to obtain an acidified fermentation product with a pH in the range of 2.5 to below 8 (hereinafter also referred to as the acidification step).

The amount of propionate in the fermentation product that is used as starting material in the process is generally in the range of 0.5-10 wt % (weight-based percentage), more in particular in the range of 1-5% wt %. The amount of acetate in the fermentation product is generally in the range of 0.1-5 wt %, more in particular in the range of 0.5-2 wt %. The direct pH (directly measured without dilution of the fermentation product to e.g. a 10 wt % solution) of the fermentation product that is used as starting material is generally in the range of 6-9, more in particular in the range of 6.5 to 8.5. Said fermentation product may optionally be purified by means of a partial or complete removal of the biomass from the fermentation product. Said fermentation product may further optionally be concentrated to a fermentation product with a propionate concentration of maximally 30 wt %.

In the acidification step lactic acid is added to the fermentation product to obtain a pH in the range of 2.5 to below 8. In particular, the pH is in the range of 3 to 7, and more particular in the range of 3 to about 6.6 or 6.8. The end concentration of lactic acid is generally in the range of 0.1-60 wt % of the fermentation product, more in particular in the range of 10-50 wt % and most preferably in the range of 25-50 wt %. Said acidification step may optionally be carried out simultaneously with the above-described concentration step. Further, a heating step may be introduced to raise the temperature of the fermentation product before or during addition of said lactic acid.

A next step of the process may comprise the addition of a base to the resulting acidified fermentation product, concentrated or not) comprising propionate and acetate in order to obtain a product with a direct pH of at least 5 (hereinafter also referred to as the base-addition step or the neutralization step). More in particular, the pH after addition of said base may be at least 6 and preferably at least 6.5. While the upper limit for the pH is not critical, the pH will generally be at most 8 and more in particular at most 7.5. The composition obtained after addition of the base may optionally be concentrated.

It was found that when use was made of a composition that comprises propionate and acetate made via a fermentation process as described in the embodiments above and optionally lactate, a food product was obtained with even more satisfactory sensory properties such as e.g. taste than compared to a composition comprising a blend of separately-prepared propionate and acetate and optionally lactate components. The fermentation-wise made composition apparently comprises other components or impurities that have a positive contribution on the taste and other sensory properties of the food product. Particular satisfactory results were obtained when the method according to the present invention with the fermentative-wise made composition was applied to meat products (including fish and poultry).

The lactic acid or lactate that is added to the fermentation product may also be obtained via fermentation using conventional production methods. In one embodiment, lactic acid or lactate is obtained via a separate fermentation process comprising the following steps: the fermentation of a sugar-based substrate to form a lactate-comprising fermentation product, a partial or complete biomass removal step, an acidification step to form lactic acid, optionally an alkalinisation step (also referred to as neutralisation step) to form the desired sodium or potassium salt of lactic acid and optionally a concentration step which may take place before or after the acidification and/or before or after the alkalinisation step.

A further possible option is to obtain lactate via or in the same fermentation process that generates the fermentation product containing propionate and acetate. Hereto, the fermentation reaction medium comprises propionate/acetate-producing micro-organisms and lactate-producing micro-organisms. Examples of propionate-producing micro-organisms are bacteria from the family of the genus Propionibacteriaceae (e.g. *Propionibacterium acidi-propionici, Propionibacterium freudenreichii, Propionibacterium thoeni* and/or *Propionibacterium jensenii*) or from the genus *Selemonas*. The use of *Propionibacterium freudenreichii* subsp. *shermanii* is preferred. Examples of lactic acid-producing micro-orgamisms are fungi, yeasts and more preferably lactobacilli such as *Lactobacillus delbrueckii, Lactobacillus acidophilus* or *Lactobacillus paracasei* or moderately thermophilic bacilli such as *Bacillus coagulans, Bacillus thermoamylovorans, Geobacillus stearothermophylus* and *Bacillus smithii*.

An other possibility is to use lactate as substrate for fermentation and to use propionate-producing micro-organisms in fermentation that are able to convert the lactate into propionate such as mentioned in U.S. Pat. No. 4,814,273 or in WO 85/04901 and U.S. Pat. No. 4,794,080, the contents hereof incorporated herein.

These above-described embodiments wherein the lactate component is made via fermentation result in a composition comprising propionate, acetate and lactate and rich in other unknown components and impurities which cause further unexpected changes in the sensory properties of the food product and especially meat product that is treated with said rich composition according to the method of the present invention.

The described compositions and method are suitable for improving the sensory properties and resistance of food and drink products to bacteria. It was found that the described compositions are in particular suitable for application in meat (including fish and poultry) products and especially for uncured meat products. As the skilled person very well knows, meat products are very sensitive to e.g. discoloration, changes in odour and changes in the 'bite and taste sensation' which may be linked to attributes such as texture, juiciness, tenderness, water holding capacity and taste in general and which may be caused due to the sensitivity of the many components that are present in a meat product and their interaction, such as the various fats, proteins, salt, phosphates and other components well-known to the person skilled in the art.

The meat product may be cooked or uncooked (also referred to as 'fresh') and the cooked meat product may be cured or uncured. It is noted that in the present specification the word meat also includes poultry and fish products. Fresh meat may comprise untreated and treated meat in the sense that the meat has been treated and accordingly may comprise additives.

Examples of suitable uncooked/fresh real meat products are beef, ground beef, beef steak, beef oxtails, neckbones, short ribs, beef roasts, stew meat, beef briskets, pork, pork chops, pork steaks, cutlets, pork roasts, lamb, veal, game goat, filet américain, steak tartar, patties or carpaccio. Examples of fresh poultry include chicken, turkey, duck and other poultry such as cornish hen, dove, quail and pheasant. Examples of fresh fish includes both finfish (fillet, anchovy, barracuda, carp, catfish, cod, croaker, eel, flounder, haddock, herring, mackerel, mullet, ocean perch, pike, pompano, porgy, ray, salmon, sardines, sea bass, shark, smelt, sturgeon, swordfish, trout, tuna, whiting), shellfish (abalone, clams, cronch, crab, crayfish, lobster, mussels, oysters, scallops, shrimp and snails) and other seafoods such as jellyfish, octopus, roe, squid, turtle, frog legs.

Examples of suitable cooked meat products are roast beef, roast lamb, roast pork, ham, salami, frankfurters and other sausages. Examples of suitable cured meat products are cured pork ham, frankfurters, and other cured sausages. Examples of suitable uncured meat products are cooked chicken, turkey meat, and roast beef or lamb.

Because uncured meat products are more sensitive to the growth of micro-organism than cured meat products, the described compositions are particularly attractive for application in uncured meat and poultry products.

The described compositions may be used against various micro-organisms such as yeasts, molds and bacteria.

Preferably the described compositions are used for improving the resistance of food and drink products and in particular meat products against food spoilage and food poisoning bacteria such as *Listeria* (in particular *Listeria Monocytogenes* spp), *Escherichia coli* (in particular *Escherichia coli* O157:H7 spp), *Salmonella* (in particular *Salmonella typhimurium* spp, *Salmonella enteriditis* spp), *Pseudomonas spp, Enterobacter* (in particular *Enterobacter Sakazaki* spp), *Clostridium* (in particular *Clostridium botulinum* and *Clostridium perfringens*) and *Campylobacter* (in particular *Campylobacter jejuni* spp).

Particular good results were found when the described compositions were applied against food spoilage bacteria in fresh meat products and against *Listeria Monocytogenes* in meat products (cooked and uncooked/fresh).

In the earlier-mentioned food and drink products, and especially the meat products, the composition as used in the method is present as ingredient in the final food, drink or meat product. The components of the antibacterial composition may be present on the surface of said products or inside the products. The described compositions may be applied during one or more of the various stages in the food processing process including the stages of the manufacture, the handling, the storage and/or the preparation of said food or meat product. It may be applied not only in the final product stage but also during or in a washing step such as applied in the processing of fruit and vegetables. The composition as used in the method may be applied or introduced by various means such as for example as a spray, a rinse or a wash solution or as solution wherein the various food products are dipped. The components of the composition may also be introduced by injection into the food and meat product. Further, the method and composition may be used to treat containers with prior to, simultaneously with or subsequently after packaging the food and meat products.

Dependent on the type of application and on whether the composition used in the method is used as active ingredient in the final product or as component of for example a wash solution or spray solution, the components of the composition will vary in concentration and in internal ratio.

The propionate, acetate and/or lactate salts may be added separately or in combination. They may be added in solid, particulate, form or dissolved in an aqueous solution. The addition in an aqueous solution may be preferred, because it makes it easier to distribute the acids homogeneously through the meat product.

If the salts are added in the form of an aqueous solution, the use of an aqueous solution comprising 3 to 10 wt % propionate, 2 to 8 wt % acetate and 15 to 60 wt % lactate, and a sodium/potassium ratio between 0 to 0.4 and more preferably 0.05 to 0.2 wt % whereby the potassium concentration is in the order of 10 to 20 wt %, is most suited for application in various food and drink products. For most meat products and applications, the above-mentioned solution preferably has a direct pH (i.e. directly measured in the solution without further dilution) between 6 to 9% or, when diluted to a solution of 10 wt % a pH between 5 and 8.

Aspects of the present invention further relate to the method wherein use is made of highly concentrated solutions containing potassium and sodium. By combining potassium and sodium-based solutions comprising propionate, acetate and optionally lactate it was found that much higher concentrated solutions with much favorable viscosities can be obtained then in the case the solution only comprises the sodium-based salts of propionate, acetate and optionally lactate. The high concentration and much favorable viscosity is advantageous in transport (e.g. lower costs) and in handling and application of the solutions in food and drink products. The highly-concentrated composition has a concentration of potassium of about 1 to maximally 35 wt %, more preferably 1-27 wt %, a concentration of propionate of about 1 to maximally 65 wt %, an acetate concentration of about 1 to maximally 44 wt % and a lactate concentration of about 0 to maximally 62 wt %. Most optimal and providing favorable results when used in the method according to the present invention is a composition with the above-mentioned concentration ranges that further fulfills the criteria set as described in the various embodiments in the present application for the weight-based ratio for respectively lactate/propionate, acetate/propionate and optionally sodium/potassium.

The following non-limitative examples further illustrate aspects of the present invention.

EXAMPLES

Experiment 1

A taste comparison test was done with cooked turkey rolls wherein a composition was used based on a potassium blend ("potass. blend") of acetate, propionate and lactate (15 wt % potassium with about 4 wt % propionate, lactate/propionate ratio is about 9, acetate/propionate ratio is about 0.7, 2 wt % sodium) versus a composition based on a sodium blend ("sodium blend") of acetate, propionate and lactate (the same blend as above but then with about 15 wt % sodium and no potassium). For the taste test different rolls of 800 g of cooked turkey were prepared. The turkey meat was salted with brines containing sodium chloride, sodium triphosphate, maltodextrine, carrageenan, corn starch, water and a potassium based composition or a sodium based composition. The brine injection level is 25%. No other preservatives were used. Meat compositions are given in Table 1 in percentage of the batch.

TABLE 1

Composition of the three cooked turkey rolls

| Ingredients | Nr 1: Control | Nr 2: potassium blend | Nr 3: sodium blend |
|---|---|---|---|
| Meat | 80.00 | 80.00 | 80.00 |
| Water | 12.48 | 8.98 | 8.98 |
| Sodium tri phosphate | 0.42 | 0.42 | 0.42 |
| NaCl | 1.90 | 1.90 | 1.90 |
| Maltodextrine | 1.50 | 1.50 | 1.50 |
| Potass. blend | — | 3.50 | — |
| Sodium blend | — | — | 3.50 |
| Carrageenan ME2251(R) | 0.70 | 0.70 | 0.70 |
| Modified corn starch | 3.00 | 3.00 | 3.00 |
| Total | 100.00 | 100.00 | 100.00 |

The following process was used to prepare the cooked turkey rolls:
  13 mm grounded turkey meat was stored for one day at 0° C.
  The ingredients of Table 1 were mixed with the meat.
  The turkey meat was packed in bags (no vacuum) and tumbled 2 times for 2 hours with 30 minutes rest in between.
  The meat-paste was stored during 14 hours at 0° C. in a bag.
  Turkey rolls were prepared with an average diameter of 5-5.5 cm and cooked during about 1.75 hours in a water bath at 80° C.
  The cooked uncured turkey breast rolls were chilled in cold water and stored for at least 7 days at 0° C.

Sensory Test

Six taste panellists assessed the samples saltiness, sourness, sweetness and turkey taste. Slices of 0.2 cm. were given to the panellists at room temperature. They ranked the attributes from 0 (not perceived) to 5 (strong).

TABLE 2 taste test results

| Taste attribute | Nr 1: Control | Nr 2: potassium blend | Nr 3: sodium blend |
|---|---|---|---|
| Saltiness | 2.8 | 4.0 | 3.5 |
| Sourness | 2.0 | 1.4 | 1.0 |
| Sweetness | 1.2 | 1.2 | 3.2 |
| Turkey taste | 2.5 | 2.2 | 2.2 |

The results of Table 2 indicate a distinct difference in the taste sensation and in particular to the undesired sweetness due to the potassium based blend used in comparison with the sodium based blend.

Experiment 2

Solutions as used in the method according to the present invention were made having the following compositions as described in Table 3.

TABLE 3

Compositions as used in the present invention

| Composition | 1 | 2 | 3 | 4 | 5 | 6 | 7 | 8 |
|---|---|---|---|---|---|---|---|---|
| Potassium lactate wt % | 27.2 | 27.0 | 52.6 | 54.5 | 11.3 | 11.6 | 43.4 | 43.1 |

TABLE 3-continued

Compositions as used in the present invention

| Composition | 1 | 2 | 3 | 4 | 5 | 6 | 7 | 8 |
|---|---|---|---|---|---|---|---|---|
| Sodium propionate wt % | 24.9 | 24.7 | 4.8 | 4.8 | 10.2 | 10.7 | 4.0 | 3.9 |
| Sodium acetate wt % | 7.9 | 7.9 | 1.6 | 1.5 | 32.2 | 34 | 12.5 | 12.6 |
| Sodium/potassium ratio | 1 | 1 | 0.1 | 0.1 | 3.3 | 3.5 | 0.3 | 0.3 |
| Propionate/acetate ratio | 3.3 | 3.3 | 3.3 | 3.3 | 0.33 | 0.33 | 0.33 | 0.33 |
| Propionate/lactate ratio | 1 | 1 | 0.1 | 0.1 | 1 | 1 | 0.1 | 0.1 |
| pH | 6.73 | 7.90 | 7.93 | 6.83 | 7.88 | 6.67 | 6.79 | 7.95 |

The viscosity of these solutions was measured at 6 and 26 degrees Celsius. The results are presented in Table 4. The solution having composition number 6 displayed precipitation in the form of large crystals and demonstrates that the sodium/propionate ratio should be below 1.

TABLE 4

Viscosities of the compositions as used in the present invention (in cP) measured at 6 and 26 degrees Celsius.

| Composition | 1 | 2 | 3 | 4 | 5 | 7 | 8 |
|---|---|---|---|---|---|---|---|
| At 6° C. | 19.9 | 73.7 | 27.9 | 31.9 | 20.5 | 24.8 | 42.0 |
| At 26° C. | 8.8 | 22.5 | 10.5 | 12.4 | 9.0 | 9.7 | 14.4 |

As compositions 2, 4 and 8 indicate the viscosity unexpectedly rapidly increases as more sodium is present. It is thus advantageous to minimize the sodium content and preferably no sodium at all is present.

The invention claimed is:

1. A composition comprising as anions propionate and a co-anion selected from acetate, and combinations of lactate and acetate, and as cations potassium and hydrogen, wherein the weight-based ratio of lactate/propionate is in the range of 0 to 15 and the weight based ratio of acetate/propionate is in the range of 0.05 to 3.5.

2. The composition according to claim 1 wherein the composition is an aqueous solution.

3. The composition according claim 1 wherein the ratio of acetate/propionate is in the range of 0.05 to 2.

4. The composition according to claim 1 wherein the ratio of lactate/propionate is in the range of 3 to 15.

5. The composition according to claim 1 wherein the composition contains sodium as cation.

6. The composition according to claim 5 wherein the ratio of sodium/potassium is in the range of 0.01 to below 1.

7. The composition according to claim 1 wherein the composition further comprises lactate and propionate in a weight-based ratio of lactate/propionate ranging from about 5 to 10, acetate and propionate in a ratio of acetate/propionate ranging from about 0.6 to 1.2 and sodium and potassium in a ratio of sodium/potassium ranging from about 0.1 to 0.25.

8. The composition according to claim 1 wherein the composition further comprises lactate and propionate in a weight-based ratio of lactate/propionate ranging from about 3 to 9, acetate and propionate in a ratio of acetate/propionate ranging from about 0.8 to 1 and sodium and potassium in a ratio of sodium/potassium ranging from about 0.1 to 0.35.

9. The composition according to claim 1 wherein the composition further comprises a concentration of potassium of about 1 to maximally 35 wt %, a concentration of propionate of about 1 to maximally 65 wt %, an acetate concentration of about 1 to maximally 44 wt % and a lactate concentration of about 0 to maximally 62 wt %.

10. The composition according to claim 9 wherein the composition further comprises a concentration of potassium of about 1-27 wt %, a concentration of propionate of about 1 to maximally 65 wt %, an acetate concentration of about 1 to maximally 44 wt % and a lactate concentration of about 0 to maximally 62 wt %.

11. The composition of claim 1, the composition comprising an aqueous solution comprising about 4 to 10 wt % propionate, 2 to 8 wt % acetate and 15 to 60 wt % lactate, and a sodium/potassium ratio between 0 to 0.4 whereby the potassium concentration is in the order of 10 to 20 wt %.

12. The composition of claim 1, the composition comprising an aqueous solution comprising about 4 to 10 wt % propionate, 2 to 8 wt % acetate and 15 to 60 wt % lactate, and a sodium/potassium ratio between 0.05 to 0.2 whereby the potassium concentration is in the order of 10 to 20 wt %.

13. A method for improving sensory properties and resistance of food and drink products to micro-organisms, the method comprising contacting the product with a composition according to claim 11.

14. The method according to claim 1 wherein the weight-based ratio of acetate/propionate is in the range of 0.5-2 and the weight-based ratio of lactate/propionate is in the range of 3-15.

15. The method according to claim 13 wherein the composition comprises as further cation sodium and wherein the weight-based ratio of sodium/potassium is in the range of 0 to below 1.

16. The method according to claim 13 wherein the food product is an uncured meat product.

17. The method according to claim 13 wherein the micro-organism is a food spoilage bacterium or a food pathogen.

18. The method according to claim 15 wherein the composition comprises about 4 to 10 wt % propionate, 2 to 8 wt % acetate and 15 to 60 wt % lactate, and a sodium/potassium ratio between 0 to 0.4 whereby the potassium concentration is in the order of 10 to 20 wt %.

19. The method according to claim 13 wherein said composition is made via a process comprising the following steps:
   a. providing a fermentation product comprising propionate and acetate;
   b. adding a lactic acid-comprising composition to the fermentation product in order to obtain an acidified fermentation product with a direct pH of between 2.5 and 8; and
   c. in case that the pH in step b is below 5, addition of a base to the resulting acidified fermentation product comprising propionate and acetate in order to obtain a product with a direct pH of at least 5.

20. The method according to claim 15 wherein the composition comprises about 4 to 10 wt % propionate, 2 to 8 wt % acetate and 15 to 60 wt % lactate, and a sodium/potassium ratio between 0.05 to 0.2 whereby the potassium concentration is in the order of 10 to 20 wt %.

* * * * *